Nov. 22, 1927.
W. JORDAN
LOADING DEVICE
Filed May 28, 1924
1,649,829
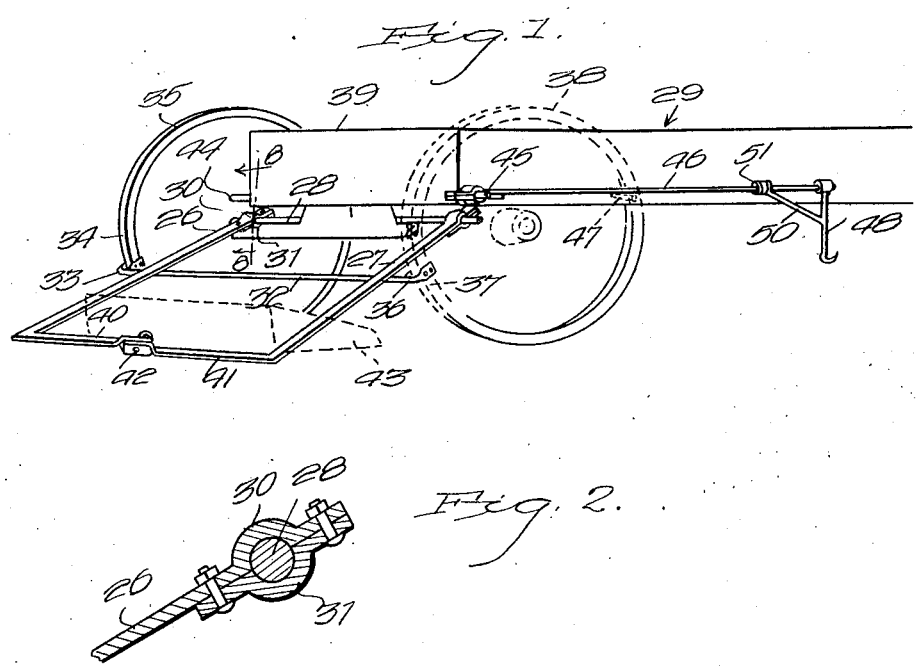
Inventor
William Jordan Patented Nov. 22, 1927.

1,649,829

UNITED STATES PATENT OFFICE.

WILLIAM JORDAN, OF NEW YORK, N. Y.

LOADING DEVICE.

Application filed May 28, 1924. Serial No. 716,509.

This invention relates to improvements in a loading device for vehicles, wheelbarrows, and the like, and has for its object to provide in connection with a wheel of said vehicle, means for delivering a load to the body thereof.

Another object of the invention is to provide in combination with a wheel, a loading lever connected therewith.

A further object of the invention is to provide in combination with a wheel, a loading lever operated thereby.

A still further object of the invention is to provide in combination with a vehicle wheel, an attachable device whereby the operation of the wheel will elevate a load to the body of the vehicle.

With the above and such other objects in view as may hereinafter more fully appear, I have invented the device illustrated in the accompanying drawings in which:

Figure 1 is a perspective of a wagon, partly broken away, and embracing my invention, and Figure 2 is a detail sectional view of a pivot part of a loader.

Like reference characters indicate like parts throughout the following specification and in the several views in the drawings in which a pair of arms 26 and 27 are pivoted at their inner ends to the axle 28 of the wagon 29. The pivotal connection may be made by a semi-cylindrical band 30, at said rear end of said arms, and a connection 31 under the axle bolted thereto. In an arrangement of this kind a yoke rod 32, having its ends 36 fixed to the rims 34 and 37 of the wheels 35 and 38, in any suitable manner such as by clips 33 so that upon the forward rotation of the wheels 35 and 38 the rod 32, mounted under the arms 26 and 27, raises said arms and throws them over the body 39 of said wagon 29. The right angular terminals 40 and 41 of said arms 26 and 27 may be fixed together by an eyebolt 42 or in any other convenient manner when desired to lift a scoop or other object 43 (shown dotted), or said members 40 and 41 may be disconnected so that either of the arms 26 and 27 may be used independently of one another in order to load material from either side of the wagon. The pivotal connection formed by the members 30 and 31 may, if desired, be secured to the pins 44 and 45, projecting from the sides of the body, instead of to the axle of the vehicle. The arm 46 may also be pivoted to the axle 28, or to any other convenient place or secured to the wheel and projected toward the front of the vehicle in which case a pin 47 or other means attached to the wheel 38 may project under or be secured to the arm 46 whereby upon the backing of the wagon or turning of the wheel 38 backward, the arm 46 will be raised to lift a load into the wagon from its side. In this case a right angular arm 48 may be pivoted to the end 49 of the arm 46 and be supported by a brace 50 bearing upon the collar 51 fixed to the arm 46 whereby upon the raising of the arm 46 the arm 48 may be swung around the body of the wagon. This latter, or simple arrangement is especially adapted for use in lifting ash cans, garbage cans and other similar articles onto the wagon body.

Having described my invention that which I claim to be new and desire to procure by Letters Patent is:

1. In a vehicle including a pair of wheels, means for lifting a load on the vehicle, and means whereby said wheels operate said lifting means, said last means connecting said wheels, and consisting of a yoke, clips carried by said yoke for fixed engagement with the rim of said wheels, said first means including an independent arm pivotally connected to said vehicle, said arm adapted to rest upon said yoke.

2. In a vehicle including a pair of wheels, means for lifting a load on the vehicle, and means whereby said wheels operate said lifting means, said last means connecting said wheels, and consisting of a yoke, clips carried by said yoke for fixed engagement with the rim of said wheels, said first means including an independent arm pivotally connected to said vehicle, said arm adapted to rest upon said yoke, said arm having a right angular free end.

3. In a vehicle including a pair of wheels, means for lifting a load on the vehicle, and means whereby said wheels operate said lifting means, said last means connecting said wheels and consisting of a yoke, clips carried by said yoke for fixed engagement with the rim of said wheels, said first means including an independent arm pivotally connected to said vehicle, said arm adapted to rest upon said yoke, said arm having a right angular free end, another similarly formed arm rod similarly connected to said vehicle.

4. In a vehicle including a pair of wheels, means for lifting a load on the vehicle, and means whereby said wheels operate said lifting means, said last means connecting said wheels, and consisting of a yoke, clips carried by said yoke for fixed engagement with the rim of said wheels, said first means including an independent arm pivotally connected to said vehicle, said arm adapted to rest upon said yoke, said arm having a right angular free end, another similarly formed arm similarly connected to said vehicle, upon the opposite side thereof.

In testimony whereof I affix my signature.

WILLIAM JORDAN.